3,567,535
PROCESS FOR MANUFACTURE OF
SUEDE-LIKE SHEET MATERIAL
Kazuo Noda, Takao Matsuura, and Hidehiko Shimamura, Kurashiki, Japan, assignors to Kurashiki Rayon Co., Ltd., Kurashiki, Japan
No Drawing. Filed Dec. 16, 1968, Ser. No. 784,233
Claims priority, application Japan, Dec. 29, 1967, 43/85,178; Feb. 1, 1968, 43/6,162; Feb. 9, 1968, 43/8,104
Int. Cl. B32b 5/18, 31/08, 31/18
U.S. Cl. 156—77                2 Claims

ABSTRACT OF THE DISCLOSURE

A process for manufacture of suede-like sheet materials comprising applying a solution of a polymer such as polyurethane to a support, such as glass or polymer sheet to form a polymer solution layer, dipping the polymer solution layer applied on the support to coagulate the polymer solution into a layer having a relatively large spongy structure in inner part, adhering a first fibrous substrate to the surface of the polymer layer with an adhesive, peeling off the support from the polymer layer, further adhering a second substrate as the first substrate to the surface of the polymer layer, which has not been adhered with the first substrate, with an adhesive and then pulling the polymer layer in the opposite directions to tear the polymer layer into two parts, whereby two suede-like sheets are manufactured at once.

---

The present invention relates to a process for the manufacture of suede-like sheet material.

A process for the manufacture of suede-like sheet materials, which comprises forming a polymeric layer having large spongy structure by wet coagulation of a layer of polymer solution and then exposing the spongy structure by uniform abrasion of the surface of the polymeric layer, is well known.

This conventional method, however, has various weak points: To obtain good appearance of the spongy structure exposed on the surface is difficult unless the surface of the polymer layer is abraded homogeneously with high accuracy, to abrade the surface with the accuracy of the order of ±0.01 mm. in order to obtain the homogeneous surface is difficult technically, and only one side of the surface can be used as the napped surface since the abraded outer skin of the sheet is converted into powder. Further, according to the method described above, when the outer skin is abraded by a sand paper, the naps of surface are directed in accordance with the directions of the sand paper to be shifted, and as a result, the appearance and the shade of color of the surface become different according to the direction of vision.

The difficult points described above are solved by this invention and the object of this invention is to provide a novel process for the preparation of suede-like sheet materials.

The process of this invention comprises:

(a) applying a layer of polymer solution to a support,
(b) coagulating the layer of polymer solution by treating with a coagulating bath to make a polymeric layer having relatively large spongy structure in inner part,
(c) adhering first substrate to the surface of polymeric layer,
(d) peeling off the support from the polymeric layer,
(e) adhering second substrate to the surface of polymeric layer exposed by peeling off the support, and
(f) tearing the polymeric layer into two parts at the middle of the layer by pulling both substrates.

It is an excellent feature of the process of this invention that change in quality and deterioration of physical properties of substrate do not occur, because substrate is not subjected to the treatment with a coagulating bath and drying in an elevated temperature which is applied to the polymeric layer in the course of forming, and that treatment of the polymeric layer is very easy, because the polymeric layer is always supported with the support from the beginning of the step for making polymeric layer to the end of step for adhering substrate, every treatment of polymeric layer is carried out by aid of support.

It is another excellent feature of the present invention to obtain the two suede-like sheet materials at once without making any by-product of polymeric powder by abrasion.

In the present invention, it is very important that the layer of polymer solution should be coagulated to the polymeric layer having spongy structure which provides the fluffy surfaces by tearing the polymeric layer into two parts.

Important factors to make such a structure by coagulating the layer of polymer solution are concentration of polymer solution and composition and temperature of coagulating bath.

In general, the spongy structure becomes large in proportion to decrease of the concentration of polymer solution. The preferred concentration range for polymer solution is from 10 to 50 weight percent. And it is recommended to select the optimum condition within this range.

The suitable compositions of coagulating bath are dependent upon sort of polymer and combination of solvent and non-solvent. In the case of using mainly polyurethane elastomer as polymeric component, suitable content of solvent in coagulating bath is 50% or less. If a large content of solvent for polymer in coagulating bath is used, the compact spongy structure is given in not so far as too low coagulating temperature is applied. Such a compact spongy structure causes the difficulty for tearing and provides flat appearance and touch due to small fluff made by tearing.

The application of high coagulating bath temperature also provides the compact spongy structure due to the slow rate of coagulation of polymer solution. In the case when the temperature of coagulating bath is too low, if concentration of solvent in coagulating bath is low, the polymeric layer having a suitable spongy structure and surface is not obtained. because, in such a condition, coagulation of surface of the layer of polymer solution is too rapid, whereas coagulation of inside part is too slow due to skin and lower rate of diffusion, and occasionally wrinkles are produced. Therefore it is preferred to determine the temperature of coagulating bath according to the concentration of solvent in coagulating bath.

Glass plates, stainless steel or various metal plates are used as the support, especially synthetic polymer sheet in thickness of from 0.05 to 1 mm. is useful. The suitable synthetic polymers for the support are nylon, polyester, polyethylene, polyvinyl alcohol and its derivatives. This synthetic polymer sheet can be easily used in preparation of polymer layer, can be easily peeled off from polymer layer without any scratch after adhering a substrate of the polymer layer, and besides can be used repeatedly.

Any kind of polymer can be used as the polymer in this invention, but it is preferred to use mainly polyurethane elastomer, which has suitable pliability and excellent strength. Polyurethane elastomer can be used either alone or in admixture with other polyurethane. Mixtures of any kind of polyurethane and other polymer may also be used.

As the polymer which can be mixed with the polyurethane elastomer, any kinds of polymers which can be dissolved by the solvents of polyurethane elastomer, such as various kinds of vinyl polymers and co-polymers, such as polyvinyl chloride and polyacrylic ester, polyvinylidene chloride, poly-α-methyl styrene, polyamide, polyesteramide, polyester, polybutadiene and co-polymer of butadiene and acrylonitrile, can be used.

Any kinds of solvents, in which the polyurethane elastomer can be dissolved, such as dimethyl formamide, dimethyl acetoamide, dimethyl sulfoxide, tetrahydrofuran, dioxane and γ-butyrolactone can be used as the solvents for the polymer. These solvents can be used either alone or in admixture. Further, non-solvent may be added to the solvent to such an extent that the dissolution of the polymer is not inhibited.

Coloring materials, such as pigments and dyestuffs, fillers and plasticizers can be added in the polymer solution. Especially, it is preferable in view of formation of the desired spongy structure to add to the polymer solution a substance having a poor affinity to the coagulating bath, which effects a mutual diffusion with the solvent for the polymer in the coagulation process of the polymer solution to promote the coagulation.

As the coagulating bath for the layer of polymer solution, use may be made of a liquid which is at least partially miscible with the solvent for the polymer, but which is not a solvent for the polymer, but it is preferable to use a mixture of a solvent for the polymer and a non-solvent for the polymer in order to obtain a polymer layer with a desired structure.

The non-solvent for the polymer should be at least partially miscible with the solvent for the polymer. Water, alcohols, such as methyl alcohol, ethyl alcohol and ethylene glycol, ethyl acetate, benzene, toluene and others can be used as the useful non-solvent. However, water is especially useful as the coagulating bath.

In the layer of the polymer after coagulation, there remains a large amount of the solvent. The product is usually washed with non-solvent for the polymer to remove the solvent and then it is dried.

Various fibrous substrates, such as especially woven cloth, knitted cloth, non-woven cloth and these cloths finished with resin may be used as the substrate.

The various adhesives are used for bonding substrate to polymeric layer. However in order to maintain the flexibility of the sheet, such an adhesive is desirable that the sheet keeps the flexible feeling after bonding them. A two liquid type polyurethane adhesive, a substantially linear one liquid type polyurethane adhesive, a mixture of polyvinyl acetate and acrylate and a self cross-linkable nitrile-butadiene rubber are applicable.

It is preferred that the adhesives are used in a state of solution or dispersion and applied with spray, brush, rollercoat or knifecoat.

In tearing of the polymeric layer into two layers, one can tear the polymeric layer by pulling by hand but there are many weak points in this method, for example, uneven napped surface is obtained, only small piece of sheet can be produced and others. Therefore, it is desired to tear continuously by pulling the substrates to the opposite direction by rotation of roller.

In the preferred embodiment of this invention, the step (a) in the above mentioned process is accomplished after a solution or dispersion of coagulation regulator which is capable of making polymeric layer having microporous structure (said solution or dispersion may contain polymer), is applied to the substrate and is dried if necessary. In this embodiment, the coagulation regulator penetrates into the lower part of the layer of polymer solution, thereby the lower part of the layer of polymer solution can be coagulated to compact structure, so that durable suede-like sheet material which hardly fall off the fluff from the substrate can be obtained.

As coagulation regulator for making microporous structure, it is effective to use hydrocarbons, carboxylic acids, carboxylates, amides, nitriles, sulfonates, ureides or urethanes which have alkyl group containing from 4 to 50, preefrably from 12 to 20 carbon atoms.

Among these coagulation regulators, the compound which has alkyl group containing 12 or more carbon atoms, has an effect for making separation of the polymeric layer from the support easy. Therefore, if such compound is used, the support is easily peeled off from the polymeric layer.

The examples of the coagulation regulator are shown as follows:

Saturated or unsaturated hydrocarbons, such as octane, decane, eicosane, docosane, decene, octadecene including various isomers, 3,7,11-trimethyl-1,3,610-dodecatetraene and squalene;

Carboxylic acids such as adipic acid, sebacic acid and stearic acid;

Carboxylic esters, such as octyl caproate, octadecyl laurate, octyl palmitate and methyl stearate;

Nitrile, such as capronitrile, lauronitrile and stearonitrile;

Amides, such as hexanoylamide, octanoylamide, lauric acid amide and stearic acid amide;

Sulfonates, such as methyl octadecane sulfonate;

Ureids, such as lauric acid monoureid, tridecenoic acid monoureid, palmitic acid monoureid, stearic acid monoureid and oleic acid monoureid;

Urethanes of higher alcohols, such as capryl, undecyl, lauryl, myristyl, pentadecyl, cetyl, stearyl, oleic alcohol and decanediol, α-naphthyl urethane and phenyl urethane.

These compounds are used alone or in admixture and in the form of solution or dispersion having a concentration of 0.01 to 20%, preferably 0.01 to 5%.

In order to make the middle part of the polymeric layer macroporous structure, it is preferred to add coagulation regulator for making macroporous structure, such alkyl alcohol having alkyl group containing from 4 to 50 carbon atoms, to the solution of polymer.

The preferred pore size of the middle part of polymeric layer having macroporous structure, is from 50 to 300 microns in the cross-section diameter and such a range of pore size is suitable for making suede-like surface. The suitable cross-section diameter of pore in the lower part of polymeric layer is 10 or less micron.

The invention is further illustrated by the following examples in which all percentages and parts are based on weight.

EXAMPLE 1

One part of stearyl alcohol and two parts of carbon black treated with metal soap, were dispersed in 100 parts of 15% dimethylformamide solution of polyurethane elastomer prepared from polyethylene propylene adipate of a mean molecular weight of 2,000 having hydroxyl groups at both ends (molar ratio of ethylene units and propylene units, 9:1), p,p'-diphenylmethane diisocyanate and ethylene glycol (molar ratio, 1:5:4). The viscosity of the polymer solution was 20 poises.

The polymer solution was applied to polyester film (support) 0.15 mm. in thickness and was coagulated in a coagulating bath of 30% dimethylformamide aqueous solution at 30° C. and washed with hot water (70° C.) for 20 minutes completely coagulating polymers and removing most of dimethylformamide from polymeric layer and dried in hot air at 80° C. The thickness of polymeric layer obtained was 0.4 mm. and the spongy structure in polymer layer was detected by using a magnifying-glass with a low power.

Tricot was adhered to a surface of the polymeric layer by using an adhesive, the support was peeled off from the polymeric layer. Another tricot was adhered to the surface of the polymeric layer peeled off from support by using an adhesive. When both tricot cloths were pulled towards opposite directions, the polymeric layer was torn at the middle into two sheets having fluff on the appeared surface.

The appearance and touch af these two sheets are like a suede and therefore these sheets are suitable for shoe upper leather, handbags and upholstery.

EXAMPLE 2

On hundred and fifty parts of polyethylene propylene adipate of an average molecular weight of 1,500, having hydroxyl groups in both ends (molar ratio of ethylene units and propylene units, 9:1) was reacted with 50 parts of p,p'-diphenyl methane diisocyanate at 140° C., the prepolymer obtained was dissolved in 400 parts of dimethylformamide. Polyurethane elastomer was obtained by adding 200 parts of dimethylformamide including 12 parts of p,p'-diaminodiphenyl methane to this prepolymer solution.

The viscosity of mixture of 15% of this polyurethane elastomer, 8% of polyvinyl chloride, 8% of fine crystalline cellulose, 1% of toluene and 68% of dimethylformamide, was adjusted at 60 poises.

This polymer solution was applied on a glass plate to a thickness of about 0.6 mm., was coagulated by dipping into 40% aqueous solution of dimethylformamide for 20 minutes at 40° C., was washed with hot water at 70° C. for 1 hour and dried in hot air at 80° C.

The polymeric layer obtained has spongy structure consisting of from 30 to 80 micron pores in diameter.

A knitted cloth was adhered on the surface of polymeric layer by using an adhesive and the glass plate was peeled off from the polymeric layer. Another knitted cloth was adhered to the exposed surface of polymeric layer peeled off from the support by using an adhesive. After that, two suede-like materials were obtained at once by tearing polymeric layer at the middle by pulling both knitted cloths.

EXAMPLE 3

The 0.15 mm. thickness polyethylene terephthalate sheet (support) was coated in an amount of 30 g./m.$^2$ with a solution consisting of 2% of cellulose octadecyl urethane, 13% of polyurethane elastomer described in Example 1, 2% of carbon black and 83% of dimethylformamide. The above treated sheet was furthermore covered in a thickness of 0.8 mm. with a mixture of 13% of polyurethane elastomer, 2% of carbon black, 1% of stearyl alcohol and 84% of dimethylformamide, one over the other. The solution of polymer was coagulated at 30° C. in a coagulating bath consisting of 30% of dimethylformamide and 70% of water, and was washed with water and dried to obtain the sheet having the polymeric layer bound to the support. The polymeric layer consists of three parts, the skin layer on the surface, the upper layer with a comparatively large porous spongy structure near the surface and the lower layer with compact spongy structure made by control of coagulation rate with effect of cellulose octadecyl urethane near the support.

The surface of polymeric layer was coated with the two liquids-type polyurethane adhesive and was adhered with tricot (substrate I). Successively the support was easily and nicely peeled off from the polymeric layer, because cellulose octadecyl urethane used as coagulating modifier gives the effect of easy peeling.

As the next process, the peeled surface of polymeric layer was adhered with tricot (substrate II) by using the above used adhesive to prepare the sandwich structure consisting of tricot, polymeric layer and tricot in order. When both tricot cloths were pulled in the opposite directions, the sandwich sheet was torn into two parts around the polymeric layer with large spongy structure near the fine sponge polymeric layer for obtaining two suede-like sheet materials having the finely uniform fluff.

This suede-like sheet material in which the surface layer or the compact structure parts are bound to the substrate, is durable and suitable for clothes, bags, shoe upper leather for lady, and cloth lining of furniture.

EXAMPLE 4

The 0.1 mm. thickness nylon-6 film (support) was covered at a ratio of 35 g./m.$^2$ by a roller coat with a mixture of 15% of polyurethane elastomer, 2% of sorbitol monostearate, 35% of dimethylformamide and 48% of tetrahydrofuran, which was prepared after sorbitol monostearate was dissolved in dimethylformamide-tetrahydrofuran solution of polyurethane elastomer. The coated film was dried and furthermore was covered at 0.8 mm. thickness with a mixture of 13% of polyurethane elastomer, 2% of carbon black, 1% of stearyl alcohol and 84% of dimethylformamide, one over the other. This coated film was dipped at 30° C. in the coagulation bath consisting of 30% of dimethylformamide and 70% of water for wet coagulation. Successively, treatments of washing solvent and drying were followed.

The resulting polymeric layer consists of a comparatively large wet sponge layer near the surface and a compact sponge layer near the support by the effect of sorbitol monostearate. The polymeric layer was adhered by using an adhesive with the porous non-woven sheet made from nylon staple (substrate I). Successively the support was peeled off from the polymeric layer with easiness and uniformity given by the effect of sorbitol monostearate. Following this process, this exposed surface of polymeric layer by peeling the support, was adhered by using an adhesive with the same substrate (II) as the substrate (I). The porous polymeric layer near the fine structure layer made by coagulating modifier, was divided into two parts having the uniform fluff by pulling both substrates.

EXAMPLE 5

The sheet of 0.5 mm. thickness, made from polyvinyl alcohol polymer, was coated with a mixture of 13% of polyurethane elastomer, 2% of carbon black, 1% of stearyl alcohol and 84% of dimethylformamide. This covered sheet was dipped at 30° C. into a bath consisting of 30% of dimethylformamide and 70% of water for wet coagulation. The finished sheet was washed to remove solvents and was dried. The resulting polymeric layer was sealed with plain cloth (substrate I). Successively the support was peeled off from the polymeric layer and the exposed surface of polymeric layer by peeling the support was sealed with the same calico weave cloth (substrate II) to prepare the piled layers, successively consisting of cloth, porous polymeric layer and cloth. Following this process, the polymeric layer was divided at the middle into two parts having the uniform fluff by pulling both substrates.

EXAMPLE 6

The 0.15 mm. thickness polyethylene terephthalate sheet (support) was covered at a rate of 3 g./m.$^2$ with 5% water emulsion of cellulose octadecyl urethane by using spray and was dried. The above treated sheet was covered furthermore at 0.8 mm. thickness with a mixture of 13% of polyurethane elastomer, 2% of carbon black, 1% of stearyl alcohol and 84% of dimethylformamide, one over the other. The coated polymer was coagulated at 30° C. in a coagulating bath containing 30% of dimethylformamide and 70% of water by wet method. The polymeric sheet obtained was washed with water and dried to provide the sheet having the polymeric layer bound to support. The polymeric layer consists of three parts, the surface layer, the upper layer with large spongy structure near the surface and the lower layer with fine spongy structure made by control of coagulation rate due to effect of cellulose octadecyl urethane near the support.

The surface of polymeric layer was applied with the two liquids-type polyurethane adhesive and was adhered with tricot (substrate I). Successively the support was easily and nicely peeled off from the polymeric layer due to the effect of cellulose octadecyl urethane used as a coagulation regulator. As the next process, the peeled surface of polymer layer was adhered with tricot (substrate II) by the above used adhesive to prepare the sandwich structure consisting of tricot, polymeric layer and tricot in order. When both tricot cloths of sheet were pulled in the opposite directions, the sandwich sheet was torn into two parts around the polymeric layer with large spongy structure near the fine sponge polymeric layer for obtaining two suede-like sheet materials having the uniform fluff.

This suede-like sheet, in which the surface layer or the compact structure parts are bound to the substrate, is fast and suitable for clothes, bags, shoe upper leather for lady and cloth for lining of furniture.

What is claimed is:
1. A process for the manufacture of suede-like sheet material which comprises;
   (a) applying a layer of polymer solution to a support,
   (b) coagulating the layer of polymer solution by treating with a coagulating bath to make a polymeric layer having a relatively large spongy structure in the inner part,
   (c) binding a first substrate to the surface of the polymeric layer with an adhesive,
   (d) peeling off the support from the polymeric layer,
   (e) binding a second substrate to the surface of the polymeric layer exposed by said peeling off of the support with an adhesive, and
   (f) tearing the polymeric layer into two parts at the middle of the layer by pulling the both substrates.
2. The process as claimed in 1, wherein in said step (a) said support is previously coated with a solution or dispersion of a coagulation regulator.

References Cited
UNITED STATES PATENTS

| | | | |
|---|---|---|---|
| 2,972,558 | 2/1961 | Bramble | 156—254 |
| 3,240,855 | 3/1966 | Voelker | 156—254 |
| 3,284,274 | 11/1966 | Hulslander et al. | 156—77X |
| 3,379,604 | 4/1968 | Weber et al. | 156—249X |

BENJAMIN R. PADGETT, Primary Examiner

R. S. GAITHER, Assistant Examiner

U.S. Cl. X.R.

156—235, 249, 254